3,357,855

METHOD OF MANUFACTURING RECORDING TAPE WITH IMPROVED CROSS-LINKED BINDER FOR THE RECORDING LAYER

Johan Heinrich Bisschops, Berchem-Antwerp, and André Jan Conix, Antwerp, Belgium, assignors to Gevaert Photo-Producten N.V., Mortsel, Belgium, a Belgian company No Drawing. Filed July 6, 1964, Ser. No. 380,615
Claims priority, application Great Britain, July 26, 1963, 29,730/63
6 Claims. (Cl. 117—138.8)

ABSTRACT OF THE DISCLOSURE

A process of making recording tape wherein the polymeric binding agent for the magnetic particles in the recording layer is selected to contain functional groups reactive with an isocyanate compound and is cross-linked by means of the decomposition products of a polycarboxylic acid azide. The azide is provided in the coating composition of the layer and the cross-linking reaction is instituted by heating the coated tape to decompose the azide into a polyisocyanate. Optionally the binding agent can itself contain polycarboxylic acid azide substituents.

This invention relates to a process for the manufacture of magnetic recording material.

For the magnetic recording of sound signals, data-recording in computers and video-recording, use is made of magnetic recording tapes. These magnetic recording tapes most often consist of a ferromagnetic recording layer, which has been coated onto a flexible support and which normally consists of magnetic susceptible particles, which are homogeneously dispersed in a non-magnetic binding agent.

Since the application field of the magnetic recording material is ever more extending, the magnetic recording layers have to meet higher requirements with regard to the wear resistance, smoothness and packing density of the magnetic susceptible particles.

In the Belgian patent specification 612,896 a process is described and claimed for obtaining a magnetic recording layer with oriented magnetic susceptible particles, an increased packing density of the particles, a higher smoothness and better wear resistance. Said process comprises coating onto a support a dispersion of magnetic susceptible particles in a solution of a fully latent isocyanate and of a binding agent, which contains groups being capable to react with isocyanate groups, drying the recording layer thus obtained below the temperature whereon the latent polyisocyanate generates a compound containing free isocyanate groups, and allowing by heating the generation of said compound containing free isocyanate groups and the reaction of these isocyanate groups with the binding agent. By "fully latent polyisocyanate" is meant the reaction product, which is produced by the addition of a compound containing an active methylene group to any isocyanate group of a polyisocyanate compound.

It has now been found that in a process for the manufacture of magnetic recording tape other latent polyisocyanates than those defined in the said patent specification may be used.

The process according to the present invention for the manufacture of a magnetic recording layer comprises applying to a support a dispersion comprising magnetic susceptible partices in a soution of (*a*) a poymeric binding agent, which contains groups being capable to react with isocyanate groups, and of (*b*) a polycarboxylic acid azide, drying the recording layer below the reaction temperature of the polycarboxylic acid azide, and allowing said polycarboxylic acid azide to cross-link said polymeric binding agent by heating.

Orientation of the magnetic susceptible particles is preferably carried out in the applied recording layer during the evaporation of the solvent for the polymeric binding agent. Occasionally, in order to obtain a very efficient packing density of the magnetic susceptible particles, the layer applied may be calendered before the polymeric binding agent has lost its thermoplastic character.

According to a preferred embodiment of the invention acicular ferromagnetic $\gamma$-$Fe_2O_3$ is dispersed in a solution of (*a*) a thermoplastic polymeric binding agent, which is capable to react with free isocyanate groups, and of (*b*) a polycarboxylic acid azide. This dispersion is then filtered to free it from coarse particles, which possibly are left after grinding, whereupon it is deaerated. Finally the dispersion is coated onto a support according to known methods.

For orienting the acicular ferromagnetic powder, the recording layer which still contains solvent, soon after its coating traverses a solenoid having a magnetic field strength of about 1000 oe. After the evaporation of the solvent, the recording layer may be calendered in order to fill up the openings between the powder particles and the binding agent and thus, as is said above, to obtain a greater packing density of the magnetic susceptible particles.

The reaction of the polycarboxylic acid azide with the thermoplastic polymeric binding agent is started by heating the magnetic recording tape at a temperature above the decomposition temperature of the polycarboxylic acid azide. Preferably, the hardening reaction takes place at a temperature beyond the softening point of the polymeric binding agent containing groups, which are reactive with isocyanate groups. Heating may be executed, for instance, by means of an infra-red radiation unit.

Upon heating the recording layer, the temperature at the front side should not be higher than the softening point of the support. Preferably a polyethylene terephthalate support is used, which is biaxially and symmetrically stretched.

In order to obtain a better adhesion of the recording layer to the support, the latter is preferably covered with a subbing layer, which is firmly attached with one side to the support and with the other side of the recording layer. A subbing layer consisting of a copolymer of vinylidene chloride and of acrylonitrile (95/5) is preferred for covering a polyethylene terephthalate support. This subbing layer possesses a very good affinity for a polyethylene terephthalate support as well as for the ferromagnetic dispersion layer manufactured according to the present invention.

An example of a polymeric binding agent suitable for being applied to the process according to the present invention, is a thermoplastic macromolecular compound carrying groups, which are reactive with isocyanates. A review of the different groups, which are reactive with isocyanates, can be found in Chemical Review, 57, 47–76 (1957). Among these reactive groups may especially be mentioned hydroxyl groups, amino groups and thiol groups, although other groups are not to be excluded. These reactive groups may be substituted directly on the main polymeric chain as well as on side chains. The polymeric material carrying the reactive groups may be a natural polymer, which may be chemically modified, a synthetic polymerization product, a polycondensation product or a polyaddition product.

Among the natural polymers carrying free hydroxyl groups may be mentioned cellulose esters and cellulose ethers such as nitrocellulose, acetylcellulose, propionylcellulose, butyrylcellulose, acetylbutyrylcellulose, benzylcellulose and ethylcellulose containing free hydroxyl groups.

Synthetic polymerization products which can be cross-linked according to the process of the invention are polyvinyl alcohol, partly esterified or acetalized polyvinyl alcohol and copolymers containing in their polymeric structure a substantial amount of vinyl alcohol groups. In this case the comonomer or comonomers may be styrene and its nuclearly substituted derivatives, vinyl chloride, vinylidene chloride, vinyl esters, vinyl ethers, acrylic and methacrylic acid esters, acrylonitrile, methacrylonitrile, butadiene and the like.

These comonomers are worked up in the synthetic polymerization product in order to provide after cross-linking the above polymeric binding agents with a maximum of strength and wear resistance. Synthetic polycondensation or polyaddition products carrying free hydroxyl groups are, for instance, polyamides containing hydroxymethyl or hydroxyethyl substituents on the polymeric chain, epoxy resins such as the polyether obtained by the polycondensation of 2,2-bis(4-hydroxyphenyl)-propane and epichlorohydrin.

Natural and synthetic polymers carrying free amino groups are, for instance, polyvinylamine and polyaminostyrene. Polycondensation products containing in their polymeric chain groups of the formula —NH.CO— such as polyamides, polyesteramides, polyurethanes and polyureas are also suited.

Polymeric materials containing thiol groups are represented, for instance, by the condensation product of polyisophthalylidene hexamethylenediamine and thioglycolic acid as described in Example 5 of the Belgian patent specification 622,556.

As heat-sensitive cross-linking agents polycarboxylic acid azides are added to the above enumerated polymeric binding agents. By heating, the polycarboxylic acid azide is decomposed into a polyisocyanate. For instance, a dicarboxylic acid azide decomposes by heating into a diisocyanate under evolution of nitrogen $$N_3-\overset{\displaystyle O}{\overset{\|}{C}}-R-\overset{\displaystyle O}{\overset{\|}{C}}-N_3 \longrightarrow O=C=N-R-N=C=O + 2N_2$$

In this formula R represents any bivalent organic radical; a number of said radicals is exemplified more explicitly hereinafter.

The diisocyanate formed will react with the reactive groups of the polymeric binding agent present and cross-link the polymeric material. For instance, the reaction with a polymeric binding agent bearing free hydroxyl groups and represented by the formula

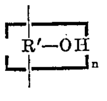

can be written as follows:

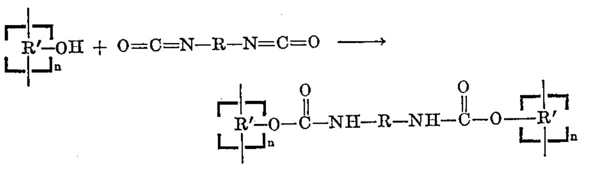

In the same way polymers containing other substituents reactive with isocyanate groups may be cross-linked.

The above reaction scheme is only given by way of explanation of what can occur by heating the dispersion of the polymeric binding agent and of the polycarboxylic acid azide. The invention, however, is independent of whatever the mechanism of cross-linking may be.

The polycarboxylic acid azides, which are useful as heat-sensitive cross-linking agents according to the invention, may be manufactured from a large list of aliphatic, aromatic and heterocyclic polycarboxylic acids by causing the acid chlorides of these acids to react according to known methods with sodium azide or by causing the hydrazides of these acids to react with sodium nitrite.

As aliphatic dicarboxylic acid azides may be used for instance diazides of succinic acid, adipic acid, pimelic acd, sebacic acid and especially of tartaric acid.

Among the azides of aromatic dicarboxylic acids may especially be mentioned isophthalic acid diazide, terephthalic acid diazide and their derivatives, for instance 5-nitroisophthalic acid diazide. Azides of polycarboxylic acids having in their structure two phenyl groups are also valuable such as bis(azidocarboxyphenyl)-ether, 2,2'-bis(4 - azidocarboxyphenyl)-dichloromethane and bis(4-azidocarboxyphenyl)-ketone.

Azides from aliphatic-aromatic dicarboxylic acids are also suited such as 2,2 - bis(4 - azidocarboxymethoxyphenyl)-propane, p-phenylenediacetic acid diazide and hydroquinonediacetic acid diazide. So too are azides from olefinic-aromatic dicarboxylic acids such as benzene-1,4-diacrylic acid diazide.

The polycarboxylic acid azides may also be manufactured starting from polycarboxylic acids having more than two carboxyl groups such as pyromellitic acid and trimellitic acid. In this way may be manufactured the diazide or the polyazide of pyromellitic acid such as the diazide of pyromellitic acid diallyl ester or the diazide of pyromellitic acid dimethyl ester.

Heat-sensitive cross-linking agents are also found among the heterocyclic polycarboxylic acid azides such as pyridine-2,6-dicarboxylic acid diazide, pyridine-2,5-dicarboxylic acid diazide and pyridine-2,4-dicarboxylic acid diazide.

Polymeric polycarboxylic acid azides can also be used as heat-sensitive cross-linking agents such as polystyrene-p-carboxylic acid azide obtained by reaction of poly-p-vinyl-benzoyl chloride with sodium azide.

A special and very interesting embodiment of the invention is given when the polymeric binding agent carrying groups which are reactive with the decomposition products of carboxylic acid azide groups, moreover carries carboxylic acid azide substituents. Such a polymer, for instance, is the above polystyrene-p-carboxylic acid azide, which can be cross-linked by heating.

The ratio by weight of the polymeric binding agent to the heat-sensitive cross-linking agent may be varied as desired or as conditions may require, but ordinarily will lie within about 99/1 and about 75/25. The ideal concentration of the polycarboxylic acid azide will be dependent, of course, on the specific polycarboxylic acid azide and polymeric binding agent used. In each individual case the optimum concentration can be determined by trial and error.

In the above Belgian patent specification latent polyisocyanates are used, which on heating split off a reactive methylene compound. This reactive methylene compound remains in the magnetic recording layer. In some circumstances, the presence of this reaction product may impair the physical properties of the layer, e.g. decrease the hardness of the polymeric binding agent. In the polycarboxylic acid azides the isocyanate functions are generated upon heating by splitting off nitrogen. In the process of the present invention small inert gas molecules are generated, which can escape through the binder by diffusion. In this way, a maximum of packing density and hardness of the magnetic layer is obtained.

The following example illustrates the manufacture of magnetic recording material according to the present invention. The amounts are expressed in parts by weight.

*Example*

A mixture of the following ingredients is ground in a ball mill for 40 hours:

| | Parts |
|---|---|
| Acicular $\gamma$-$Fe_2O_3$ | 100 |
| Polyvinylbutyral containing 88% of vinylbutyral groups, 2.5% of vinyl acetate groups and 9.5% of vinyl alcohol groups | 4 |
| 1,2-dichloroethane | 187 |
| Methanol | 40 |

To this mixture are added the following products:

| | Parts |
|---|---|
| Isophthalic acid diazide | 3 |
| Polyvinylbutyral (of the same composition as above) | 18 |
| 1,2-dichloroethane | 50 |
| Methanol | 12 |

To a polyethylene terephthalate film support is applied according to known methods a subbing layer from a 2.5% solution of copolymer of vinylidene chloride and of acrylonitrile (95/5) in a mixture (50/50) of butanone and ethyl acetate. On top of this subbing layer the recording layer is applied from the above prepared $\gamma$-$Fe_2O_3$ dispersion in such a way that the thickness of the layer is 10–12$\mu$.

The ferromagnetic recording layer is dried for 2 min. at 80° C. and thereafter heated for 1 min. at 140° C. The hardening which takes place during the latter heating confers an excellent wear resistance to the layer, without affecting the smoothness and the packing density.

We claim:

1. A process for the manufacture of a magnetic recording material, which comprises applying to a support a dispersion comprising magnetic susceptible particles in a solution of (*a*) a polymeric binding agent, which contains groups being capable to react with isocyanate groups, and (*b*) of a polycarboxylic acid azide, drying the recording layer below the reaction temperature of the polycarboxylic acid azide, and heating said polycarboxylic acid azide to decompose the same into a polyisocyanate, whereby said polyisocyanate cross-links said polymeric binding agent.

2. A process for the manufacture of a magnetic recording material, which comprises applying to a support of polyethylene terephthalate a dispersion comprising magnetic susceptible particles in a solution of (*a*) a polymeric binding agent, which contains groups being capable to react with isocyanate groups, and (*b*) of a polycarboxylic acid azide, drying the recording layer below the reaction temperature of the polycarboxylic acid azide, and heating said polycarboxylic acid azide to decompose the same into a polyisocyanate, whereby said polyisocyanate cross-links said polymeric binding agent.

3. A process for the manufacture of a magnetic recording material, which comprises applying to a support a dispersion comprising magnetic susceptible particles in a solution of (*a*) polyvinylbutyral containing 88% of vinylbutyral groups, 2.5% of vinyl acetate groups and 9.5% of vinyl alcohol groups and (*b*) of a polycarboxylic acid azide, drying the recording layer below the reaction temperature of the polycarboxylic acid azide, and heating said polycarboxylic acid azide to decompose the same into a polyisocyanate, whereby said polyisocyanate cross-links said polymeric binding agent.

4. A process for the manufacture of a magnetic recording material, which comprises applying to a support of polyethylene terephthalate a subbing layer consisting of copolymer of vinylidene chloride and acrylonitrile (95/5), coating onto said subbing layer a dispersion comprising magnetic susceptible particles in a solution of (*a*) polyvinylbutyral containing 88% of vinylbutyral groups, 2.5% of vinyl acetate groups and 9.5% of vinyl alcohol groups, and (*b*) of a polycarboxylic acid azide, drying the recording layer below the reaction temperature of the polycarboxylic acid azide, and heating said polycarboxylic acid azide to decompose the same into a polyisocyanate, whereby said polyisocyanate cross-links said polymeric binding agent.

5. A process for the manufacture of a magnetic recording material, which comprises applying to a support a dispersion comprising magnetic susceptible particles in a solution of (*a*) a polymeric binding agent, which contains groups being capable to react with isocyanate groups, and (*b*) of isophthalic acid diazide, drying the recording layer below the reaction temperature of the isophthalic acid diazide, and heating said polycarboxylic acid azide to decompose the same into a polyisocyanate, whereby said polyisocyanate cross-links said polymeric binding agent.

6. A process for the manufacture of a magnetic recording material, which comprises applying to a support a dispersion comprising magnetic susceptible particles in a solution of a polymeric binding agent which contains groups capable of reaction with isocyanate groups as well as polycarboxylic acid azide substituents thereon, drying the recordng layer below decomposition temperature of said acid azide substituents, and heating said support with the dried dispersion thereon to decompose said polycarboxylic acid azide substituents into polyisocyanate substituents which then react with the isocyanate-reactive groups of said binding agent.

References Cited

UNITED STATES PATENTS

| | | | |
|---|---|---|---|
| 2,334,476 | 11/1943 | Coffman | 260—453 |
| 2,680,131 | 6/1954 | Gold | 260—453 |
| 2,978,475 | 4/1961 | Klager | 260—453 |
| 3,149,995 | 9/1964 | Bauer | 117—66 |
| 3,149,996 | 9/1964 | Wagner et al. | 117—72 |
| 3,216,846 | 11/1965 | Hendricx et al. | 117—62 |
| 3,247,017 | 4/1966 | Eichler et al. | 117—138.8 |

WILLIAM D. MARTIN, *Primary Examiner.*

W. D. HERRICK, *Assistant Examiner.*